May 3, 1955
A. R. BIEDESS
2,707,570
MUCKING MACHINE
Filed May 27, 1952
8 Sheets-Sheet 1
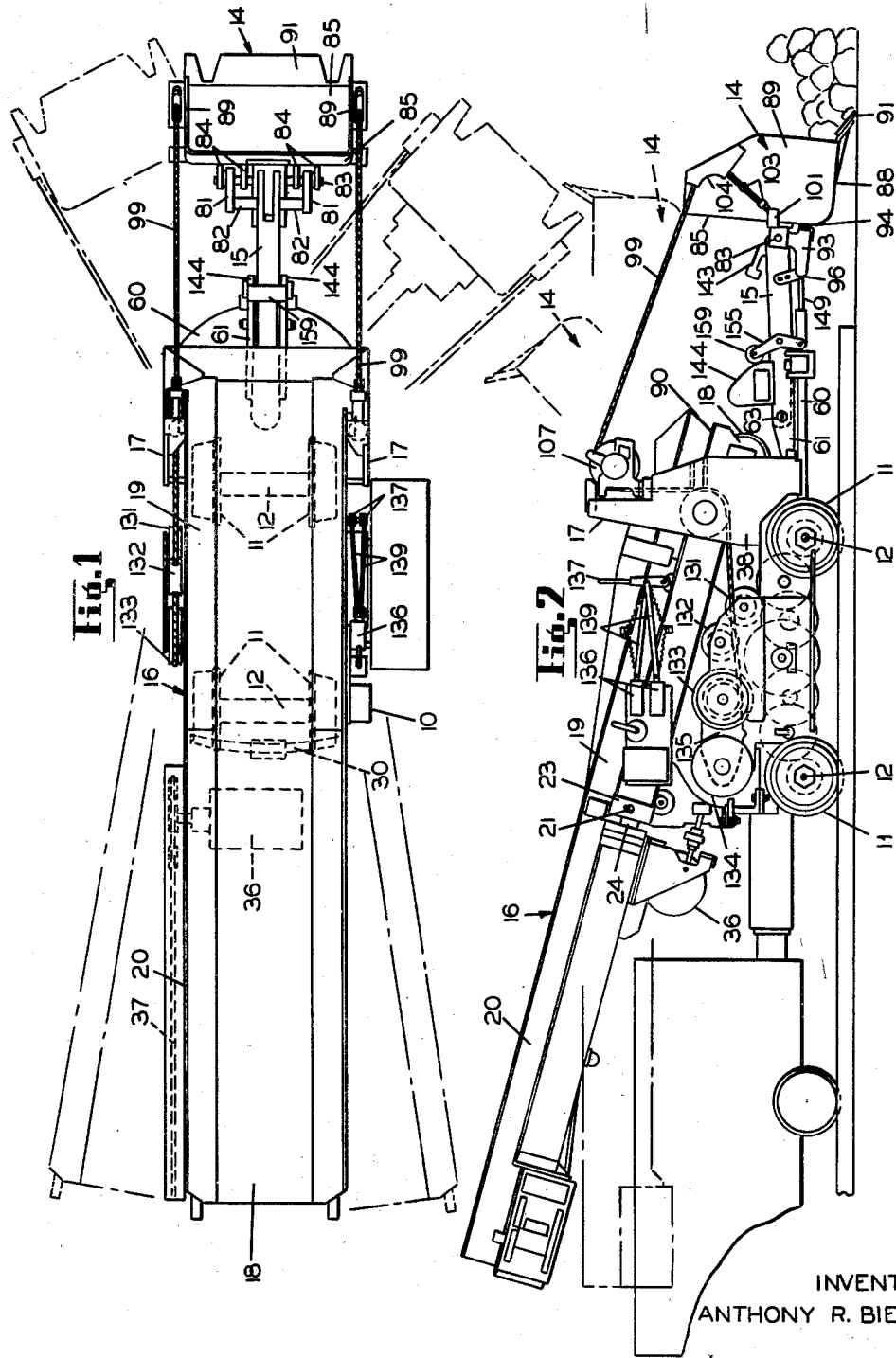
INVENTOR.
ANTHONY R. BIEDESS
BY Murray G. Gleeson
ATTORNEYS

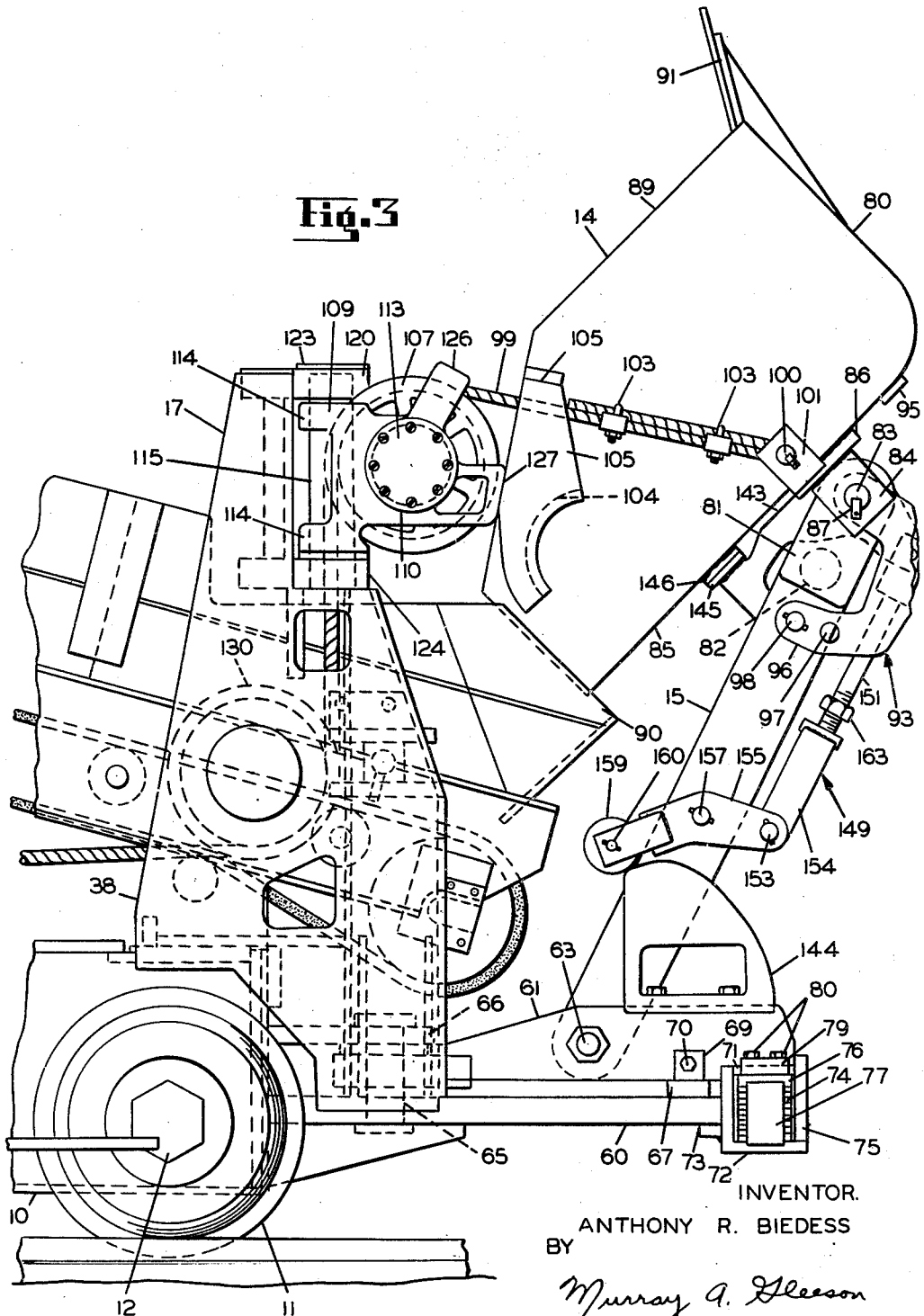

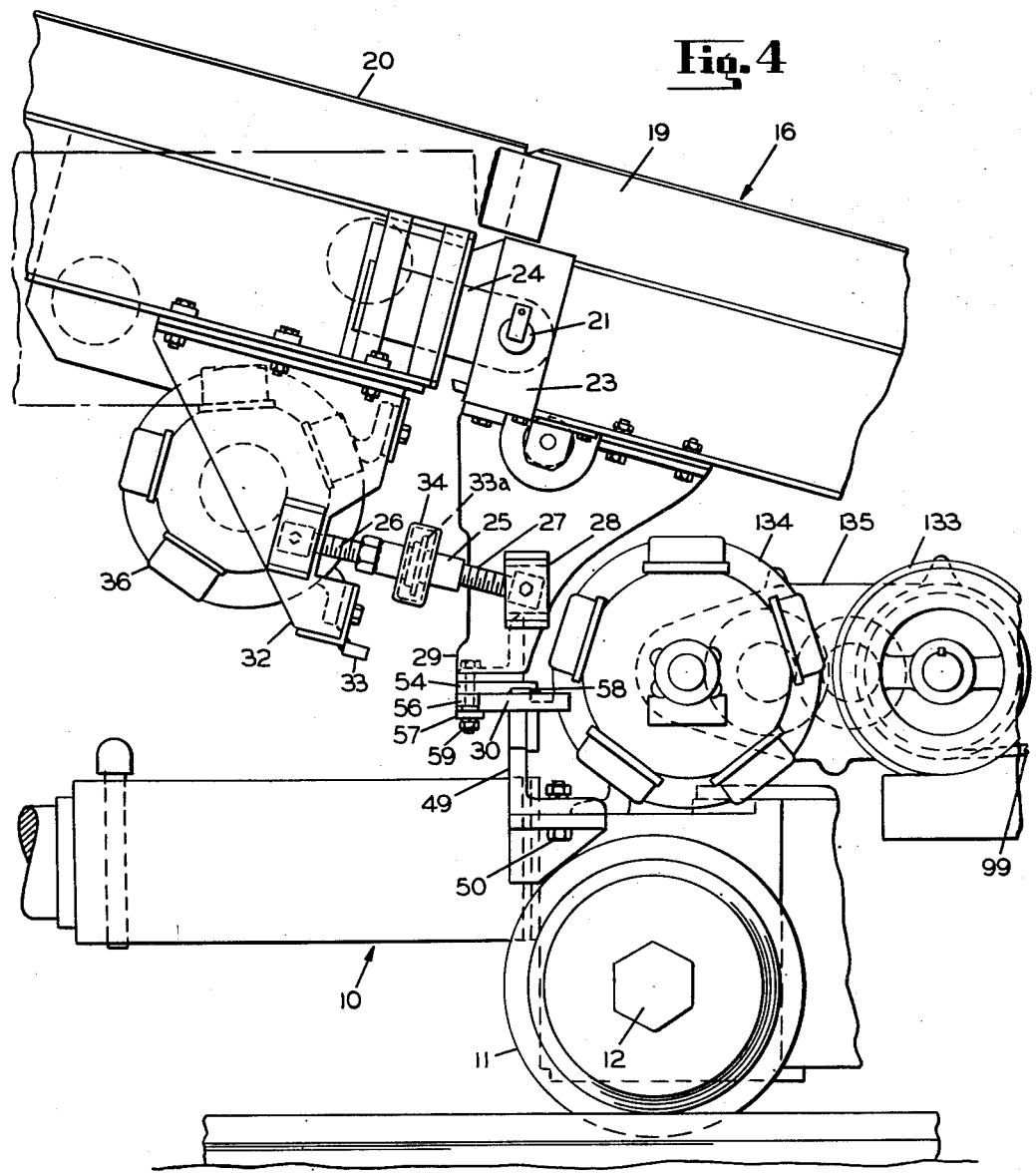

May 3, 1955  A. R. BIEDESS  2,707,570
MUCKING MACHINE
Filed May 27, 1952  8 Sheets-Sheet 5
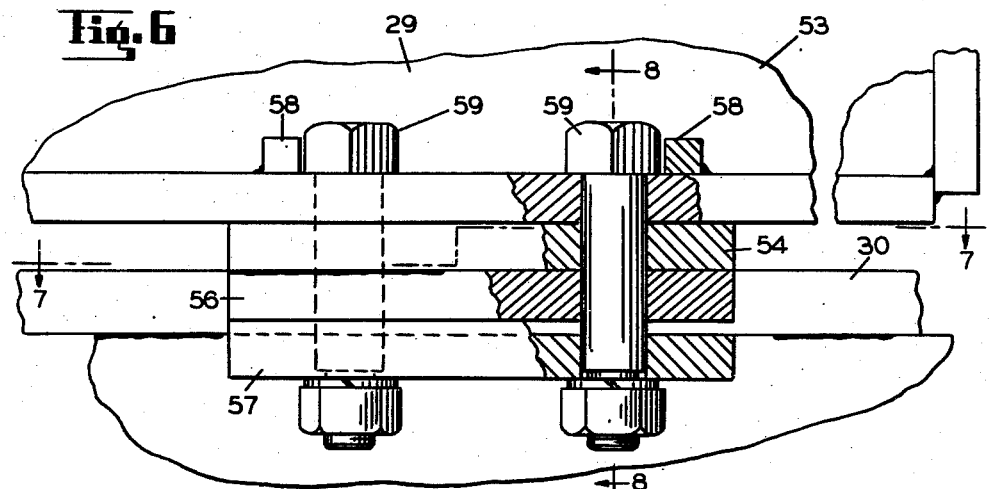
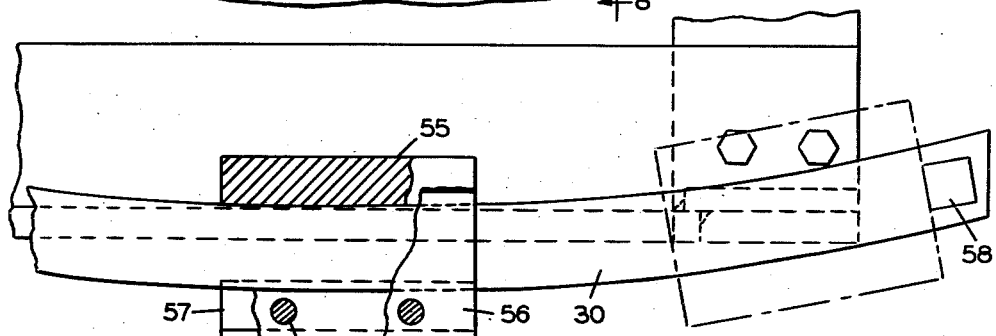
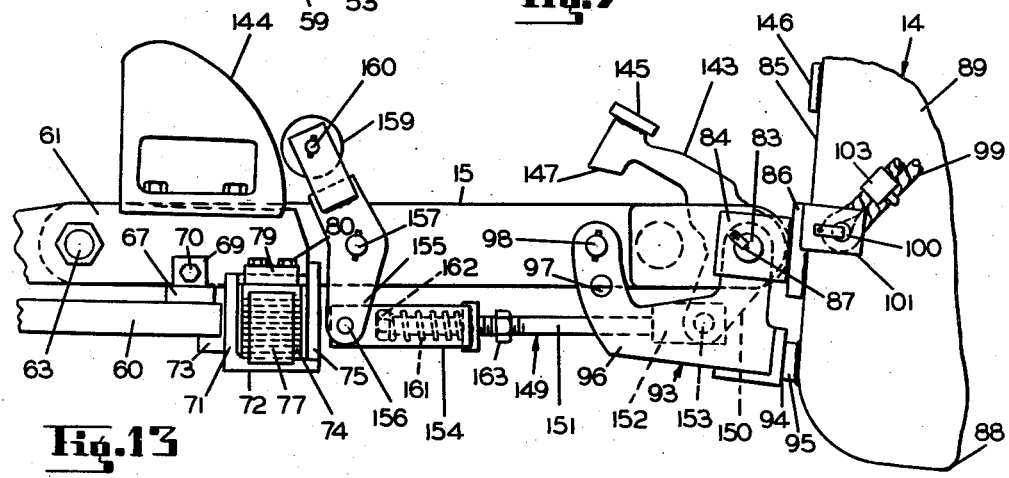
INVENTOR.
ANTHONY R. BIEDESS
BY *Murray G. Gleeson*
ATTORNEYS May 3, 1955 A. R. BIEDESS 2,707,570
MUCKING MACHINE
Filed May 27, 1952 8 Sheets-Sheet 6
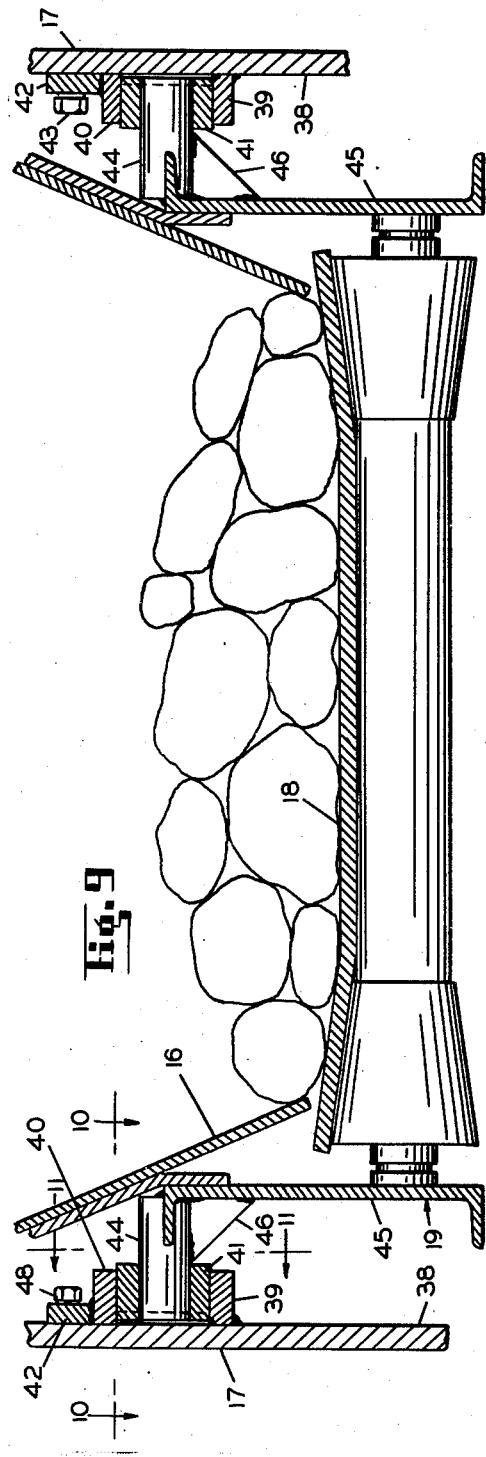
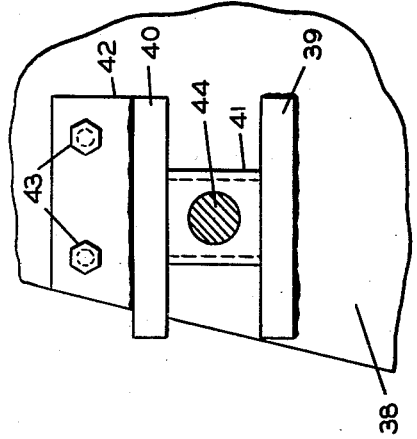
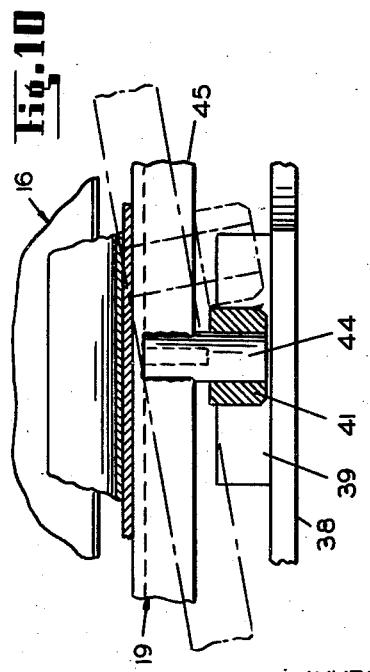
INVENTOR.
ANTHONY R. BIEDESS
BY
Murray A. Gleeson
ATTORNEYS INVENTOR.
ANTHONY R. BIEDESS
BY
Murray A. Gleeson
ATTORNEYS May 3, 1955        A. R. BIEDESS        2,707,570

MUCKING MACHINE

Filed May 27, 1952        8 Sheets-Sheet 8

INVENTOR.
ANTHONY R. BIEDESS
BY
*Murray G. Gleeson*
ATTORNEYS

United States Patent Office 2,707,570
Patented May 3, 1955

2,707,570

MUCKING MACHINE

Anthony R. Biedess, Chicago, Ill., assignor to Goodman Manufacturing Company, Chicago, Ill., a corporation of Illinois Application May 27, 1952, Serial No. 290,370

11 Claims. (Cl. 214—90)

This invention relates to improvements in mucking machines particularly adapted for loading rock and the like in tunnels and other underground excavations.

A principal object of my invention is to provide a novel and improved form of mucking machine arranged with the view toward utmost compactness particularly in vertical and lateral dimensions together with ease and simplicity in construction and operation.

Another object of my invention is to provide a novel and improved mucking machine of a type including a dipper on the end of a boom moved by draft devices into an elevated position for discharge onto an elevating conveyor, and having a novel control means for the dipper holding the dipper at a required material carrying angle during upward movement thereof and positioning the dipper at an effective dumping angle without increasing the overhead clearance required for the dipper.

Another object of my invention is to provide a mucking machine of a low overall height and width wherein a dipper is pivotally mounted on the end of a crowding and elevating boom, and discharges its load directly onto an elevating conveyor, and wherein a novel and simple form of movable stop cushions the dipper and maintains the dipper in material carrying position during upward movement thereof to a dumping position, and holds the dipper at a most efficient dumping angle for discharge directly onto the elevating conveyor of the machine.

A further object of my invention is to provide a novel, simple and efficient movable stop for the dipper of a mucking machine operated by relative movement between the boom and machine frame and maintaining the dipper in material carrying position during upward movement thereof, and holding the dipper at an effective dumping angle for discharging directly onto the elevating conveyor of the machine at the upper end of its travel, and requiring less head room from the dipper than heretofore.

A still further object of my invention is to provide a mucking machine of the type wherein the dipper is supported on a generally horizontal boom during tramming of the machine and the digging operation of the dipper, and is pivoted upwardly about the axis of the boom for discharge directly onto an elevating conveyor and wherein a novel and efficient stop operated by a cam and linkage arrangement is provided for holding the dipper in a material carrying position during upward movement of the dipper and boom, and accommodating the dipper to move to a discharge angle effective to efficiently discharge its entire load directly onto the elevating conveyor of the machine.

A further object of my invention is to provide a mucking machine having a dipper on the end of a boom discharging directly into an inclined elevating conveyor, and having a novel and simple form of mounting and support for the elevating conveyor, accommodating the conveyor for lateral swinging movement about its receiving end and maintaining its receiving end in material receiving relation with respect to the dipper in a far simpler and more effective manner than heretofore.

A still further object of my invention is to provide a novel and improved form of frame construction and support means for the elevating conveyor of a mucking machine wherein the forward end of the conveyor is supported between the side frame members of the machine for horizontal floating movement with respect thereto, and the rear end of the conveyor is retained and guided for movement along a predetermined arcuate path.

Another object is to provide a novel movable supporting and cushioning means for the dipper boom of a mucking machine.

A further object of my invention is to provide a simple and improved form of mucking machine wherein the dipper is elevated to dumping position and moved from side to side by two independently operable draft devices and wherein the draft devices are trained to the dipper about laterally spaced sheaves, each of which is mounted on a laterally swingable bracket, moved laterally by the reaction of the cable against the sheave carried thereby, and forming stops limiting upward swinging movement of the dipper and maintained in alignment therewith by the reaction of the cables thereagainst, so as to be directly engaged thereby in the plane thereof, when the dipper reaches its dumping position.

These and other objects of my invention will appear from time to time as the following specification proceeds and with reference to the accompanying drawings wherein:

Figure 1 is a plan view of a mucking machine constructed in accordance with my invention, showing the laterally extended positions of the dipper and elevating conveyor of the machine by broken lines;

Figure 2 is a view in side elevation of the machine shown in Figure 1, and showing the elevating conveyor in position to discharge into a car or the like;

Figure 3 is an enlarged view in side elevation of the forward portion of the machine showing the dipper in a dumping position.

Figure 4 is an enlarged fragmentaary view in side elevation showing certain details of the support for the rear end portion of the elevating conveyor and the adjusting means therefor;

Figure 6 is an enlarged fragmentary detail view in end elevation with certain parts broken away and in section, in order to show certain details of the slidable support for the rear end portion of the elevating conveyor on the machine frame;

Figure 7 is a fragmentary sectional view taken substantially along lines 7—7 of Figure 6 and drawn to a reduced scale;

Figure 9 is a fragmentary transverse sectional view taken through the forward end of the elevating conveyor and machine frame;

Figure 10 is a sectional view taken substantially along line 10—10 of Figure 9;

Figure 11 is a sectional view taken substantially along line 11—11 of Figure 9;

Figure 13 is a detail view illustrating certain details of the movable cushioning and positioning stop for the dipper, for holding the dipper in a material carrying position during upward movement of the boom, and in a load discharge position at the extreme path of upward movement thereof;

Figure 5:
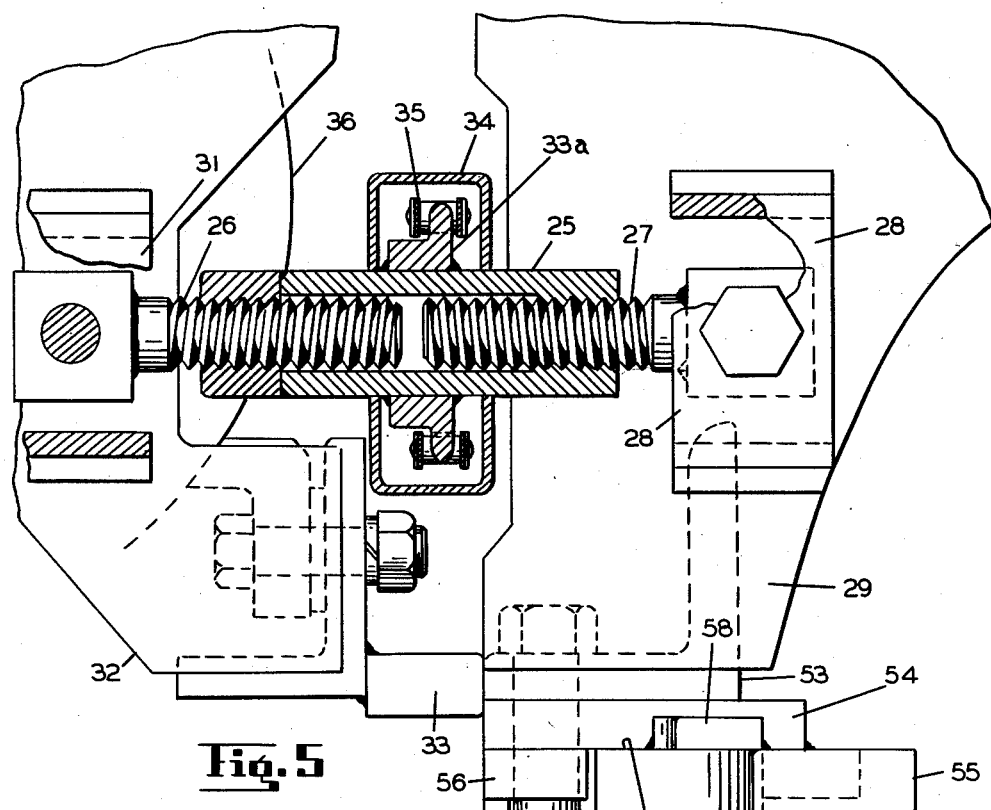
Figure 5 is an enlarged detail fragmentary longitudinal sectional view showing certain details of the sliding support for the rear end portion of the elevating conveyor of the machine frame, and the tilting mechanism for the discharge end portion of the elevating conveyor.

In the embodiment of my invention illustrated in the drawings, the machine includes generally a main frame 10 mounted on track wheels 11, 11 and axles 12, 12. The track wheels 11, 11 are reversely driven by power from a motor 13 in a well known manner to tram the machine along a track, usually positioned to extend close to the working face and the broken down rock or muck shot therefrom so loading may be effected by crowding a dipper 14 pivoted on the forward end of boom 15, extending in advance of said main frame, by the tractive effort of the track wheels 11, 11 along the track. It will be understood that the main frame may be portably mounted in any other suitable manner as for example on endless crawler treads or rubber tires running directly on the ground; accordingly, the term "wheel-mounted" as used herein should be interpreted broadly enough to cover all these means of suspension.

An elevating conveyor 16 extends along the main frame from a material receiving position between side frame structures or masts 17, 17 at the forward end of said main frame.

The elevating conveyor 16 is herein shown in Figure 9 as being a semi-trough type of belt conveyor of a well known construction including a belt 18 mounted for movement along inclined conveyor frame sections 19 and 20 mounted on said main frame 10 for lateral swinging movement with respect thereto, as will hereinafter more clearly appear as this specification proceeds.

The conveyor frame section 19 is herein shown as being supported on the frame 10 against vertical movement and as having the rear frame section 20 pivoted thereto and forming a continuation thereof. The rear frame section 20 is pivoted to the forward frame section 19 on aligned laterally spaced transverse pins 21. The pins 21, 21 each extend through a bracket 23 at the rear of said frame section 19 and spaced outwardly from and extending parallel to the side wall thereof. Each pin 21 also extends through a forwardly projecting portion 24 of the rear or discharge frame section 20.

The rear frame section 20 is pivoted about the axis of the pins 21 by means of a threaded sleeve 25 oppositely threaded adjacent its opposite ends and having screws 26 and 27 threaded therein. The screw 27 extends within and is transversely pivoted to a bracket 28 on a leg structure 29 depending from the rear end of the front frame section 19. The leg structure 29 is slidably supported at its lower end on an arcuate rail 30. The screw 26 extends within and is transversely pivoted to a bracket 31 on an arm 32 depending from the forward end portion of the frame 20. The arm 32 has a forwardly extending abutment plate 33 at its lower end, adapted to abut the rear end portion of the leg 29 and limit downward movement of the rear frame section 20 to the horizontal position shown by broken lines in Figure 4. The sleeve 25 is rotated by a sprocket 33a, herein shown as being welded to said sleeve. The sprocket 33a is shown as being partially enclosed within a housing 34, and is driven by an endless chain 35. Said chain may be either manually or power operated, the drive therefor not being shown herein since it is no part of my present invention.

A motor 36 mounted on and depending from the bottom of the frame section 20 inside the arm 32 is provided to drive the conveyor belt 18. The drive from said motor to said conveyor belt may be a chain and sprocket drive such as is indicated generally by reference character 37 in Figure 2.

The forward end of the conveyor 16 and frame 19 are slidably supported on the main frame 10 between the upright frame members or masts 17, 17 at the forward end of said main frame. Each mast 17 is herein shown as being in the form of an upright side plate 38 extending upwardly along each side of the main frame 10. Each side plate 38 is shown as having an inwardly facing horizontal guide formed from two parallel spaced inwardly extending support and guide plates 39 and 40. The lower plate 39 is shown as being welded to the inside of the side plate 38 and forms a support for a block 41, forming a support for the forward end of the conveyor frame 19. The upper plate 40 is shown as being welded to the bottom of a plate 42 extending at right angles with respect to the plate 40 and secured to the inside of a side plate 38 as by cap screws 43, 43. The two sets of plates 39 and 40 thus form slidable guides for the blocks 40, 40, supporting said blocks and the forward end of the conveyor 16 for movement along said guides and for lateral axial movement with respect thereto about a vertical axis.

Each block 41 has a pin 44 pivoted therein and herein shown as extending outwardly from and as being welded to the top of a channel 45 of the forward frame 19. A gusset plate 46 is shown as being welded to the web of the channel and the under surface of the pin 44, to form a brace therefor (see Figure 9).

Figure 8:
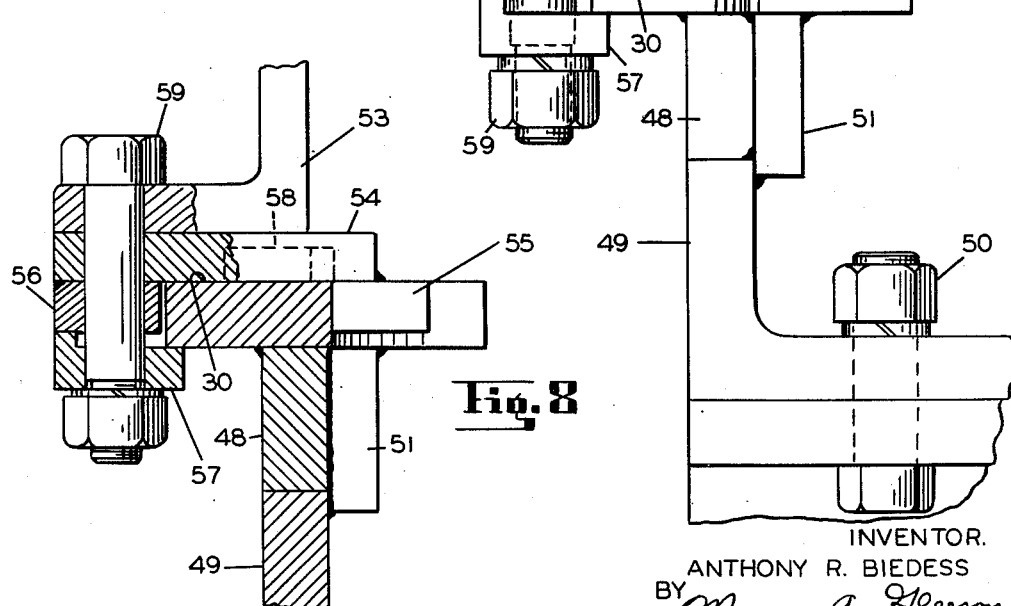
Figure 8 is a sectional view taken substantially along lines 8—8 of Figure 6.

The arcuate support rail 30 and the guiding and retaining connection for the conveyor 16 and the rear end portion of the frame 19 on said rail are shown in detail in Figures 5, 6, 7 and 8 and will now be described. The arcuate rail 30 is shown in Figure 1 as extending across the main frame 10 adjacent the rear end thereof and as being struck from a radius, the center of which is adjacent the forward end of the main frame 10 and intersects the longitudinal axis thereof. The rail 30 is shown in Figures 5 and 8 as having a spacer 48 secured thereto as by welding and depending therefrom and forming a continuation of and as being welded to the vertical leg of an angle 49. The angle 49 is shown as extending across the main frame 10 and as being secured thereto as by nuts and bolts 50, 50. A reenforcing plate 51 is shown as extending across the joint between the angle 49 and spacer 48 and as being welded at its lower end to the vertical leg of the angle 49 and at its upper end to the bottom of the arcuate rail 30.

The leg 29 is shown as having an angle iron 53 secured thereto adjacent the center thereof and depending therefrom. A bearing plate 54 is secured to the bottom of the horizontal leg of said angle and is slidably supported on the top of the rail 30. A guide plate 55 having an inner face conforming to the curvature of the inner or forward side of the arcuate rail 30 is secured to the bottom of the inner edge of the bearing plate 54 and depends therefrom. The guide plate 55 may be welded to the bearing plate 54 and slidably engages the inner or forward edge of the arcuate rail 30, to guide the conveyor 16 for lateral movement along said rail. The rear edge of the rail is slidably engaged by a guide plate 56 secured to the bottom of the projecting edge portion of the bearing plate 54, as by welding, and shown in Figure 5 as being spaced a slight distance from the rear edge of the arcuate rail 30 to allow a certain amount of freedom of movement between said bearing plate and the top surface of said rail. A retaining gib 57 is secured to the bottom of the guide plate 56 as by nuts and bolts 59, and underlaps the bottom of the rail 30 to retain the conveyor 16 to said rail during movement therealong and during operation of the machine. Stops 58, 58 are provided at opposite ends of the rail 37 to limit lateral movement of the conveyor 16.

The conveyor 16 may thus be moved laterally under guiding engagement with the rail 30 which forms a slidable support therefor, controlling movement thereof, the forward end of said conveyor being free to float horizontally during lateral movement thereof and being retained against vertical movement by the blocks 41, 41 guided in the guide plates 39 and 40 and limited in lateral movement by the inner sides of the upright side plates 38, 38.

A power means (not shown) may be provided to swing the conveyor 16 laterally along the rail 30 into the laterally extended positions shown by broken lines in Figure 1, or the conveyor may be laterally moved along said rail by hand into the desired position, it being understood that when the conveyor is once properly positioned it is retained in this position until the loading in the particular place is completed, and that the conveyor is usually only positioned laterally with respect to the center line of the machine frame when operating around a curve.

Figure 12:
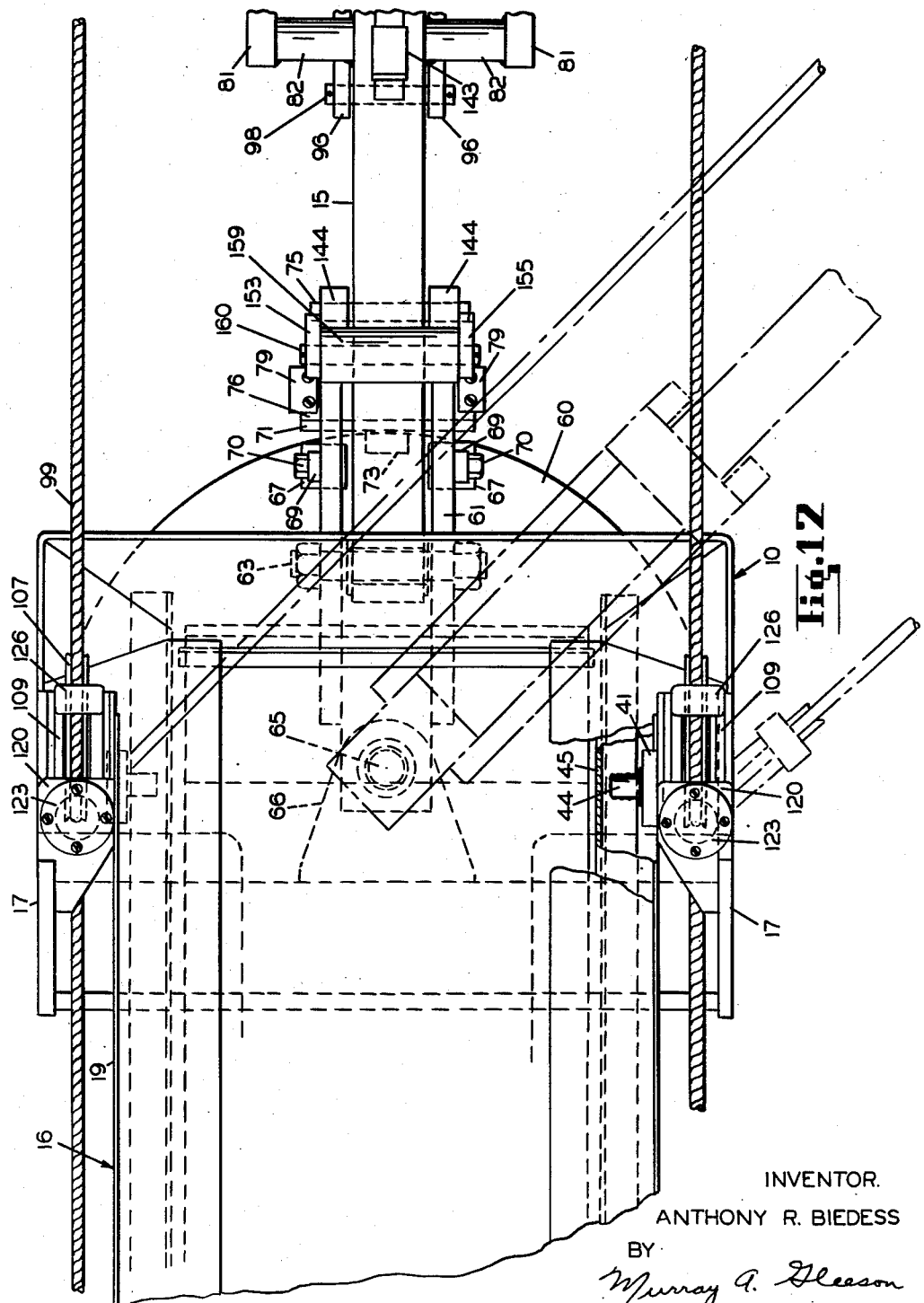
Figure 12 is an enlarged plan view of the forward end of the machine illustrating certain details of the frame construction and the mounting of the dipper boom thereon.

The boom 15 rests on a platform 60 during crowding of the scoop or dipper 14 into the muck by tramming movement of the machine along the track. The platform 60 is shown as having an arcuate forward end projecting forwardly from the main frame 10. As herein shown, the boom 15 is shown as being transversely pivoted between the furcations of a yoke 61 on a pivot pin 63 (see Figures 3, 12 and 13). The yoke 61 is pivotally connected to the platform 60 adjacent the rear end thereof on a vertical pivot pin 65. The pivot pin 65 extends through a forwardly projecting ear 66 spaced above and extending parallel to the platform 60 and positioned adjacent the rear end of said platform and also extends through the rear end portion of said yoke and platform. Bearing plates 67 are secured to the furcations of the yoke 61, as by upright ears 69, 69 projecting upwardly from said bearing plates and extending along the outer sides of the yoke 61. Cap screws 70, 70 are shown as securing said ears to said yoke. The bearing plates 67 extend beneath the yoke 61 and form a slidable support for said yoke on the platform 60 during lateral swinging movement of the dipper 14 and boom 15.

The yoke 61 is shown as being retained from vertical movement with respect to the platform 60 and as being guided for movement along the arcuate face thereof by means of a depending vertical leg 71 of an angle iron 72. The angle iron 72 is secured to the bottom of the yoke 61 on the leg 71 and depends therefrom and extends transversely thereof downwardly along the arcuate face of the platform 60. The leg 71 is spaced a slight distance from the face of said platform to afford relatively free movement between said angle and platform. A retaining lug or gib 73 is shown as being welded to the rear face of the vertical leg 71 beneath the bottom of the platform 60 and as extending inwardly along the under surface of the platform 60, to retain said yoke to said platform, during upward swinging movement of the boom 15.

A shock absorbing means, which may be stacked rubber pads 74 supported on the horizontal leg of the angle 72, is shown as being provided to absorb the shock of downward movement of the boom 15 and dipper 14. The pads 74, 74 are carried in a channel formed between the vertical leg 71 and an end plate 75 extending upwardly from the end of the horizontal leg of the angle 72 and are spaced from said vertical leg and end plate. A bearing plate 76 rests on the top pad 74 and has guide plates 77 extending downwardly from each end thereof and slidably engaging the outer ends of the horizontal leg of the angle 72. Retainers 79, 79 extend upwardly along opposite sides of the yoke 61 and are secured to the bearing plate 76 by cap screws 80, 80. The edges of the pads 74, 74 are spaced from the leg 71, end plate 75 and retainers 77, 77, so as to compress and absorb the shocks as the boom 15 is dropped on the bearing plate 76.

The dipper 14 is pivotally supported on the end of the boom 15 on a transverse pivot pin 83. The pivot pin 83 extends through two pairs of parallel spaced ears 84, 84 projecting from the bottom 85 of the dipper 14 along each side of the forward end portion of the boom 15. The ears 84, 84 are shown as being welded to and extending from a transverse reinforcing plate 86 extending along the bottom wall 85 of the dipper. The dipper is held from lateral twisting movement with respect to the boom 15 by spaced members 81 extending between the lugs of each pair of lugs 84 and pivoted on the pin 83. The opposite ends of the members 81 are secured to and extend from the ends of shafts 82, 82 secured to the boom 15 and extending therefrom in opposite directions. Retainers 87, 87 secured to said ears as by cap screws and engaging the ends of the pin 83 are provided to retain said pin to said ears.

The dipper 14 has a front wall 88 extending at right angles to the bottom wall 85, and has side walls 89, 89 connecting said bottom and front walls together. As usual with dippers used on mucking machines of this same general type, the dipper has no rear wall and in the form of my invention herein shown, discharges directly into a hopper 90 extending across and along the forward end and sides of the receiving end of the conveyor 16, for directing the muck onto said conveyor. The forward edge of the dipper may be serrated or may have a hardened serrated lip detachably mounted thereon to root under the loose muck, or else may have separate digger teeth secured thereto. In the form shown, the forward edge of the dipper is provided with a digging lip 91, which may be hardened, and is shown as being recessed adjacent opposite edges thereof, to provide two laterally spaced digging teeth and a central widened digging or pick-up lip.

An abutment member 93 is provided to abut the bottom wall 85 of the dipper 14 during crowding of the dipper lip 91 into the loose muck. The abutment member 93 is shown in Figure 7 as being mounted on the pivot pin 83 and as depending therefrom. Said abutment member has a bearing angle 94 extending across the forward face and bottom thereof, the vertical leg of which abuts a bearing plate 95 secured to the bottom wall 85 of the dipper 14 during crowding of said dipper. The abutment member 93 is shown as having arms 96, 96 extending from the bearing plate 94 rearwardly along the boom 15 and upwardly along opposite sides of said boom. The arms 96 are shown as having a plurality of spaced apertures 97, 97 therein and are secured to the boom by pivotal pin 98 extending through said boom and the selected apertures 97, to afford a means to vary the angle of the dipper with respect to the ground when in a crowding position.

The dipper 14 and boom 15 are moved from side to side along the bearing plate 60 and are elevated and moved into centered relation with respect to the hopper 90 and receiving end of the conveyor 16 during upward movement thereof by means of two independently operated flexible draft devices 99, 99, herein shown as being ropes or cables, but which may also be flexible chains. Each draft device 99 is shown as being clamped to a laterally extending pin 100 mounted in a side wall 89 of the dipper 14 at its inner end and in a bracket 101 at its outer end. The draft devices 99, 99 are secured to the pins 100, 100 by means of spaced cable clamps 103, 103 of a usual construction. Each draft device 99 extends from a pin 100 upwardly in a forwardly inclined direction when the dipper 14 is in a crowding position and around a reaction shoe 104, shown as extending outwardly from the side wall 89 of the dipper 14 adjacent the forward upper end portion thereof when the dipper is in the crowding position shown in Figure 2. A retainer plate and abutment member 105 extends from the reaction shoe 104 in parallel spaced relation with respect to the outer wall 89 of the dipper 14, to the extreme upper advance edge of said dipper, to retain the draft device in position to engage the reaction shoe 104 upon downward movement of the dipper. From the reaction shoe 104 the draft devices 99, 99 extend in an upwardly inclined direction through and about direction changing idler sheaves 107, 107 at the upper ends of the masts 17, and extending forwardly therefrom.

It should here be noted with reference to Figure 2, that when the dipper 14 is in a lowermost position adjacent the ground and pull is exerted thereon by the draft devices 99, 99 that the reaction of the pull will be taken at the reaction shoes 104, 104. This will positively pivot the dipper about the axis of the pivot pin 83. During this upward pivotal movement of the dipper 14, the reaction of the forces applied thereto will retain the boom 15 in engagement with the platform 60. When, however, the dipper has been moved upwardly into a material carrying position, the pull thereagainst will be a substantially straight line pull, substantially in alignment with the pivot pin 83. This will pivot the dipper 14 and boom 15 about the axis of the pivot pin 63 to a discharge position. The means for controlling movement of the dipper to retain it in material carrying position during upward movement thereof and to hold it at the proper discharge angle, when at the upper end of its path of travel will be more fully explained as this specification proceeds.

Figure 14:
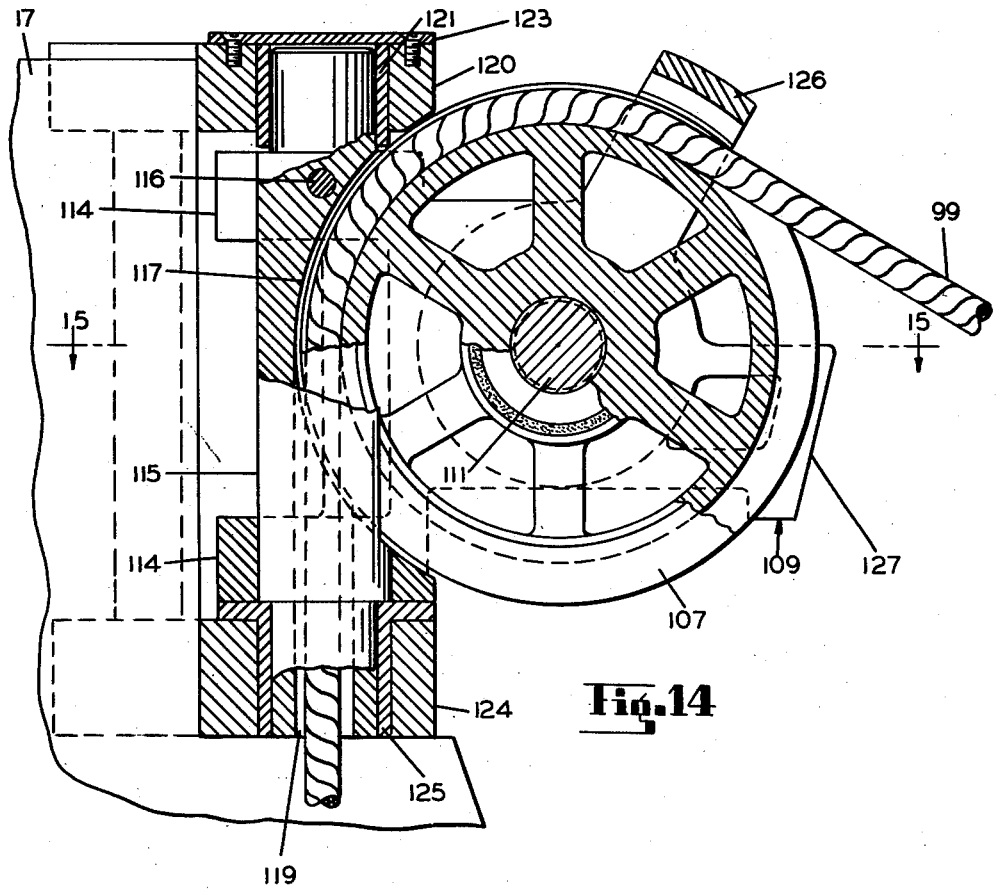
Figure 14 is an enlarged view in side elevation with certain parts broken away and in section, showing certain details of the swingable sheave and movable stop for the dipper.
Figure 15:
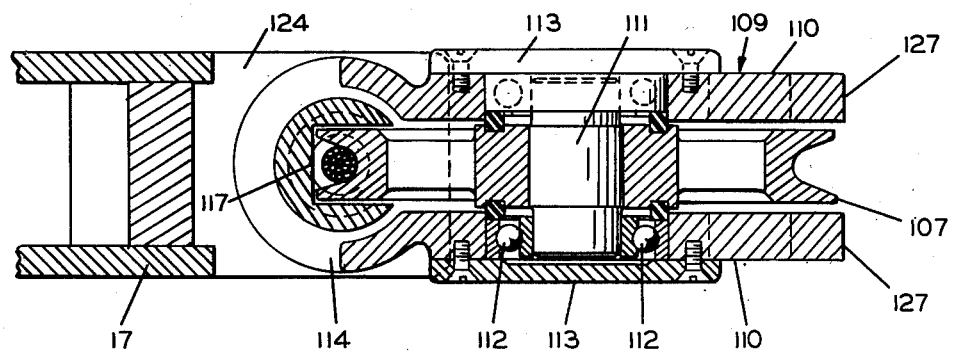
Figure 15 is a sectional view taken substantially along lines 15—15 of Figure 14.

The direction changing sheaves 107, 107 are each mounted at the upper end of a side frame structure or mast 17 and extend forwardly therefrom. As herein shown, each direction changing sheave 107 is mounted in a swingable sheave bracket 109 between side walls 110, 110 thereof on a shaft 111. The shaft 111 is journaled at its ends in the side walls 110, 110 on ball bearings 112, 112 mounted in the side walls 110, 110 and retained thereto by end retaining plates 113, 113. The side walls 110, 110 of the bracket 109 terminate adjacent their rear ends into vertically spaced annular bosses 114, 114, shown as being mounted on a pivot pin 115 projecting upwardly and downwardly therefrom. The pivot pin 115 is shown as being secured to the upper annular boss 114 by pin 116. The pivot pin 115 is shown as being recessed, as indicated by reference character 117, to receive the sheave 107, and as having a hole 119 drilled from the lower end thereof and intercepting the recess 117 to accommodate the draft device 99 (see Fig. 14). The upper end of the pin 115 is shown as being journaled in a bracket 120 extending outwardly from the frame structure or mast 17 adjacent the upper end thereof. A bearing 121 retained to the bracket 120 by a retainer plate 123 is provided to journal the upper end of the pin 115 in the bracket 120.

The lower end of the pin 115 is journaled in a bracket 124 projecting outwardly from the mast 17. A flanged bearing 125 is shown as forming the bearing for the lower end of the pin 115. The flange of said bearing forms a thrust bearing and support for the lower annular boss 114.

With the pivoted bracket structure just described the draft device 99 may be trained downwardly along the axis of pivotal movement of the bracket and the reaction of the draft device against the dipper will maintain the sheave 107 and bracket 109 in alignment with the side wall 89 of the dipper 14.

The side walls 110, 110 of the bracket 109 are shown as having an integrally formed retaining member 126 extending angularly upwardly therefrom in a generally forward direction and over the sheave 107, to retain the draft device 99 to said sheave during operation of the machine.

The side walls 110, 110 also have forwardly projecting abutments or stops 127, 127 extending therefrom adjacent the lower end thereof and on opposite sides of the sheave 107 and beneath the pivotal axis thereof. The stops 127 are maintained in position to engage the retainer plates and abutment members 105, 105 of the dipper 14 by the pull of the draft devices on the dipper during upward movement thereof to a dumping position.

It should here be understood that when the dipper 14 is positioned to one side of the track by the reaction of one draft device thereagainst, during upward movement thereof to a dumping position, the pull of the opposite draft device on the dipper will center it with respect to the hopper 90 and receiving end of the conveyor 16, as is usual with mucking machines of the class herein shown and described. It should also be understood that the draft devices always maintain the stops 127, 127 in alignment with the side walls and retainers 105, 105 of the dipper 14 by the reaction of the draft devices 99, 99 against the sheaves 107, 107, positioning said stops 127 to have direct abutting engagement with the edges of the retainers 105 and forward walls of the dipper, to stop the dipper in a material discharge position regardless of the position of the dipper with respect to the conveyor 16 when in a crowding position.

From the sheaves 107, 107 the flexible draft devices 99, 99 are shown as extending downwardly through the drilled portions 119, 119 of the pins 115, 115 to and around direction changing idlers 130, 130 journaled for rotation about transverse axes and having their grooves in direct alignment with the grooves of the sheaves 107, 107. From thence the flexible draft devices 99 extend rearwardly over idler sheaves 131, 131 and under idler sheaves 132, 132, to and around winding drums 133, 133, and are secured thereto. Each winding drum 133 is shown as being independently driven through a separate motor 134, which may be an air motor of a well known form, or may be an electric or any other form of motor. The drives from the motors 134, 134 to the winding drums 133, 133 may be contained in casings 135, 135 connecting said motors with said winding drums and forming bearing supports for said winding drums, and are not herein shown or described since they form no part of my present invention.

The motors 134, 134 may be independently driven in forward and reverse directions under the control of valves indicated generally by reference characters 136, 136, and independently operated by suitable operating levers 137, 137, each of which is connected with an associated valve by a link 139.

Referring now to the novel control for cushioning and controlling the angle of the dipper 14 during upward movement thereof and holding the dipper at the proper discharge angle, the boom 15 is shown as having a forwardly opening slot 140, within which is pivotally mounted a movable abutment lever 143. The movable abutment member 143 is shown as being mounted on the pivot pin 83, and movement thereof is controlled by means of laterally spaced cams 144, 144 shown as being mounted on the furcations of the yoke 61 and extending upwardly therefrom. The movable abutment member 143 is herein shown as being in the form of a bell crank, one arm of which extends above and the other arm of which extends below the boom 15. An upwardly facing bearing plate 145 is shown as being mounted on the end of the arm extending above the boom 15. The bearing plate 145 is adapted to have abutting engagement with a bearing plate 146 on the bottom 85 of the dipper 14 to form a stop for said dipper and hold said dipper in position to retain material therein during upward movement thereof. The side of the upper lever arm of the abutment lever 143 opposite from the bearing plate 145 has an engaging face 147 inclined at the angle of the boom 15 when in an upwardly extending dumping position, which engages the boom 15 when in the dumping position shown in Figure 3 and holds the dipper at a most effective dumping angle for discharge into the receiving end of the conveyor 16.

Control movement of the stop or abutment member 143 as the dipper 14 and boom 15 are moved upwardly to a discharge position is effected by means of a yieldable link 149, pivoted at one of its ends to a depending arm 150 of the abutment member 143. The link 149 is herein shown as including a threaded rod 151 extending from a clevis 152 pivoted to the arm 150 on a pivot pin 153. The opposite end of the rod 151 slidably extends through a forward wall of a yoke 154. The sides of the yoke 154 are shown as extending along the insides of lever arms 155, 155 and as being pivotally connected thereto by a pivot pin 156. The lever arms 155, 155 are pivoted intermediate their ends to the boom 15 on a pivot pin 157 and have a follower roller 159 rotatably mounted therebetween on a pivot pin 160.

A compression spring 161 encircles the rod 151 within the yoke 153 and is interposed between the inner face of the forward wall thereof and a nut 122 threaded on the end of said rod. A nut 163 threaded on the rod 151 forwardly of the yoke 154 forms a stop to limit inward sliding movement of said link with respect to said yoke.

Upon upward movement of the dipper 14 into engagement with the bearing plate 145, the link 149 will initially yield against the compression spring 161, which serves to soften the shock upon engagement of the dipper with said plate and also to yieldably engage the follower roller with the cams 144, 144.

The cams 144, 144 are so formed as to maintain the abutment 143 in position to hold the dipper 14 with its bottom inclined upwardly at a sufficient angle to prevent spillage of material from the dipper, as shown by broken lines in Figure 2 and to maintain the dipper in this position until engagement with the abutments 127, 127. The cams 144, 144 are relieved at the tops thereof and are shown as being curved in a downward direction toward the rear of the machine to accommodate the movable abutment 143 to move inwardly with respect to the boom 15 and accommodate the faces of the stops 143, 143 to engage the boom 15 upon engagement of the dipper 14 with the abutments 127, 127, and to hold the dipper at the relatively steep discharge angle shown by broken lines in Figure 2.

Upon engagement of the dipper with the abutments 127, 127 the link 149 will yield against the compression spring 160 to cushion the shock of engagement of the abutment member with the boom 15 and maintain the follower rollers 159, 159 in engagement with the relieved face of the cams 144, 144, and also to initially pivot the dipper downwardly toward a material gathering position, upon the release of tension on the draft devices 99, 99.

In the mucking operation after the fly rock has been cleaned from each side of the track, the dipper 14 may be positioned directly in front of the track with the dipper lip 19 adjacent the ground. The machine may then be trammed forwardly by operation of the track wheels 11, 11, forcing the dipper lip 91 into the broken-down rock or muck. The dipper 14 may then be elevated by simultaneous operation of the draft devices 99, 99 under control of the control levers 137, 137 to first pivot the dipper 14 upwardly about the axis of the pivot pin 83, until the bearing plate 146 comes into engagement with the bearing plate 145 on the movable abutment 143. This will hold the dipper in the proper load-carrying position to retain the muck and rock thereon and will retain the dipper in this position upon further upward swinging movement of the dipper and boom into engagement with the movable abutments 127, 127. At the same time the movable stop 143 will move inwardly into engagement with the boom 15 against the spring 160 of the link 149 and hold the dipper at its most effective dumping angle for readily discharging the muck therefrom.

After an area directly in front of the track has been cleaned out, the dipper 14 may then be positioned to one side or the other of the center line of the track by independent operation of one or the other draft devices 99, 99, as is well known to those skilled in the art. When the dipper is positioned to one side or the other of the center line of the track, the muck is rooted and picked up in the same manner as formerly and power may then be applied to both draft devices 99, 99 to elevate the dipper and boom and at the same time pivot the boom and center the dipper with respect to the hopper 90 and elevating conveyor 16. During this operation the draft devices 99, 99 will pivot the respective sheaves 107, 107 and the sheave brackets 109, 109 into direct alignment with the side walls 89 and retainers 105 of the dipper by the reaction of said draft devices against said sheaves. The abutments 127, 127 will thus be in direct alignment with the side walls of the dipper to be directly engaged thereby and more effectively center and position the dipper for dumping, regardless of the position of the dipper when picking up its load.

It may be seen from the foregoing that an improved, simple, efficient and novel form of mucking machine has been provided which is particularly adapted to muck in confined spaces narrow in width and of low head room, and dispenses with the usual chute heretofore forming a part of the dipper boom, and instead maintains the dipper at the proper load carrying and material discharge angle to discharge directly into the receiving end of the elevating conveyor under the control of a movable stop moved in accordance with the elevation of the boom by a cam, thus assuring a rapid and thorough discharge of the dipper and avoiding spillage through the open rear end of the dipper during the picking up or loading and dumping operations.

It may further be seen that the dipper may be swung from side to side by independent operation of either of the draft devices 99, 99 and that the abutment stops engaged by the dipper when in a dumping angle are moved by the draft devices against the reaction exerted by the direction changing sheaves thereof, and are maintained in direct alignment with the dipper in all positions thereof.

It may still further be seen that the discharge conveyor of the machine is supported in a simplified and efficient manner, with its front end floatingly guided on the main frame of the machine and its rear end slidably guided for lateral movement with respect to the frame, so as to accommodate the discharge end of the conveyor to readily be positioned to one side or the other of the center line of the machine.

It will be understood that modifications and variations of this invention may be effected without departing from the scope of the novel concepts of the present invention.

I claim as my invention:

1. In a power mucking machine, a wheel mounted frame, a boom supported on said frame for movement about a horizontal axis from a generally horizontal digging position to an upwardly extending discharge position, a dipper transversely pivoted on the end of said boom and depending therefrom when in a digging position, flexible draft devices extending from an elevated position with respect to said dipper when said dipper is in a digging position downwardly to said dipper and having connection therewith, stop means on said frame engaged by said dipper when in an elevated discharge position, and control means on said frame and boom and having cooperative engagement with said dipper for maintaining said dipper in a load carrying position during upward movement of said dipper and boom and releasing said dipper upon engagement with said stop means and holding said dipper at a relatively steep discharge angle in the extreme position of upward travel thereof and comprising a cam on said frame, a follower pivotally mounted on said boom, and a movable bell crank lever pivoted on said boom and connected with said follower and operated by movement of said follower along said cam and having an abutment on one lever arm thereof having controlling engagement with the bottom of said dipper and an opposite facing abutment engageable with said boom and holding said dipper in a discharge position.

2. In a power mucking machine, a wheel mounted frame, a boom supported on said frame for vertical movement with respect thereto about a horizontal axis into a dumping position and for lateral movement with respect thereto about a vertical axis, a dipper transversely pivoted on the end of said boom and depending therefrom when in a digging position, flexible draft devices extending from an elevated position on said frame to said dipper when said dipper is in a digging position and having connection therewith for operating the same, stop means on said frame engaged by said dipper when in a dumping position, movable abutment and cushioning means on said frame and boom and having cooperating engagement with said dipper for maintaining said dipper in a load retaining position during initial upward movement of said dipper and boom and releasing said dipper to discharge into said conveyor at a relatively sharp angle upon engagement of said dipper with said stop means on said frame, and holding said dipper in said discharge position, said movable abutment and cushioning means comprising a cam on said frame, a lever pivoted on said boom, a follower on one end of said lever engageable with said cam, a movable abutment member pivoted on said boom and having engagement with the bottom of said dipper and a yieldable link connecting said lever with said abutment member and cushioning said dipper and maintaining said abutment member in engagement with said dipper and said follower in engagement with said cam during upward movement of said dipper and boom to a discharge position.

3. In a power mucking machine, a wheel mounted frame having an outboard platform extending forwardly therefrom, a yoke slidably supported on said frame and vertically pivoted thereto rearwardly of the forward end of said platform, a boom transversely pivoted to said yoke, a dipper having a bottom, front and side walls and an open rear end portion, means pivotally connecting free end of said boom with said bottom wall of said dipper in position to accommodate said dipper to depend from said boom when said boom is in a lowermost position, a movable abutment pivotally mounted on said boom and having an abutment face engageable with said dipper, means movably positioning said movable abutment to retain said dipper in the required load carrying and dumping positions during upward movement of said boom and dipper comprising a cam on said yoke, a lever pivoted on said boom, a follower on said lever engageable with said cam, a yieldable link connecting said lever with said movable abutment for moving said abutment in accordance with movement of said follower along said cam and cushioning the shocks upon engagement of said abutment with said dipper, said cam being so shaped as to maintain said movable abutment in position to hold said dipper in a material carrying position during upward travel thereof and being relieved at its upper end to accommodate said movable abutment and dipper to move to a relatively steep discharge angle for discharge from the rear end thereof at the upper end of travel of said dipper and boom, and said movable abutment having a second abutment face opposite from said first face and engageable with said boom at the upper end of travel of said dipper.

4. In a power mucking machine of the class described having a wheel mounted frame having an outboard platform extending from the forward end thereof, a laterally and vertically movable boom supported in a generally horizontal position on said platform when in a digging position, a dipper, means pivotally connecting said dipper to the free end of said boom, two laterally spaced frame members extending upwardly from said frame adjacent the forward end thereof and spaced rearwardly of the forward end of said platform, the improvements comprising movable stops pivotally mounted on said frame members on opposite sides of said boom at the upper ends of said frame members for movement about vertical axes for engagement with said dipper and having abutment faces facing said dipper, said movable stops having guide sheaves spaced rearwardly of said abutment faces and journaled therein for rotation about horizontal axes, independently operable draft devices trained about said sheaves and connected with said dipper and operable to laterally move said boom and dipper and vertically move said dipper to a discharge position into engagement with said movable stops, the reaction of said draft devices against said sheaves moving said stops laterally in accordance with the position of said dipper and maintaining said stops in direct alignment therewith regardless of the position of said dipper on said platform.

5. A power mucking machine of the class described comprising a wheel mounted frame having an outboard platform extending forwardly therefrom, a boom mounted on said platform for lateral and vertical swinging movement a dipper having bottom, front and side walls and an open rear portion, means pivotally connecting said rear wall of said dipper to said boom, to position said front wall of said dipper adjacent the ground in a digging position, two laterally spaced frame members extending upwardly from said frame adjacent the forward end thereof and rearwardly of the forward end of said platform, movable stops projecting forwardly from the upper ends of said frame members and pivoted thereto for movement about vertical axes extending along opposite sides of said boom and having forwardly facing abutment faces engageable with said dipper, a guide sheave journaled in each of said stops for rotation about horizontal axes and spaced rearwardly of said abutment faces, winding means on said frame, flexible draft devices trained from said winding means along said frame upwardly to said sheaves and downwardly therefrom to said dipper and having connection therewith for swinging said boom and dipper to either side of said frame and initially pivoting said dipper with respect to said boom, then pivoting said boom and dipper upwardly into a dumping position into engagement with said movable stops, the reaction of said draft devices against said sheaves maintaining said abutment faces of said stops in alignment with the side walls of said boom and pivoting said stops by engagement of said abutment faces of said dipper therewith to effect centering of said dipper with respect to said side frame members at the upper limit of travel of said dipper.

6. In a power mucking machine of the class described having a wheel mounted frame, a boom pivoted on said frame for lateral and vertical swinging movement with respect thereto, a dipper transversely pivoted on the end of said boom and depending therefrom when in a digging position, means for swinging said boom and dipper vertically into a discharge position and a conveyor extending along said frame in upwardly inclined direction from a material receiving position with respect to said dipper, the improvements comprising means for mounting said conveyor on said frame for lateral movement with respect thereto and for retaining the forward end thereof in material receiving relation with respect to said dipper including an arcuate rail extending transversely of said frame adjacent the rear end thereof, a shoe on said conveyor slidably engaging said rail and retained thereon to follow the curvature thereof, and a longitudinally slidable floating support for the forward end of said conveyor on said frame accommodating said conveyor for longitudinal movement with respect to said frame in accordance with the curvature of said rail and limiting lateral movement of the forward end of said conveyor.

7. In a power mucking machine of the class described having a wheel mounted frame, a boom pivoted on said frame for lateral and vertical swinging movement with respect thereto and a dipper transversely pivoted on the end of said boom, means for elevating said boom and dipper into a dumping position in centered relation with respect to said frame, and having an inclined conveyor extending along said frame having a forward end in material receiving relation with respect to said dipper when in a dumping position, the improvements comprising means for mounting said conveyor on said frame for lateral movement with respect thereto and maintaining the front end thereof in material receiving relation with respect to said dipper comprising an arcuate guide rail extending transversely of said frame adjacent the rear end thereof, guide means supporting said conveyor for movement along said rail and retaining said conveyor to follow the contour of said rail, laterally spaced horizontally extending guides extending along said frame adjacent the forward end thereof, blocks supported in said guides for movement therealong, and pivot pins extending laterally from opposite sides of said conveyor and pivotally mounted on said blocks for supporting said conveyor on said guides for free longitudinal and limited lateral movement with respect to said frame under control of said rail.

8. In a mucking machine, a main frame having two parallel spaced upright side frame members adjacent the forward end thereof, conveying means extending along said frame between said side frame members and rearwardly therefrom comprising an inclined elevating conveyor having a frame, and means supporting the rear end of said conveyor frame for lateral movement with respect to said side frame members about the forward end of said conveyor frame comprising an arcuate rail extending transversely of said main frame adjacent the rear end thereof and having arcuate forward and rear faces, a bearing plate depending from said conveyor frame having supporting engagement with said rail for movement therealong, guide means extending from said bearing plate for engagement with the arcuate faces of said rail, and slidable support means for the forward end of said conveyor frame on said side frame members comprising an inwardly opening horizontal guide extending along each of said frame members, blocks mounted in said guides for slidable movement therealong and retained from vertical movement with respect to said frame members by said guides, and supporting connections between said blocks and opposite sides of the forward end portion of said conveyor frame.

9. A mucking machine of the class described comprising a wheel mounted frame having two parallel spaced side frame members extending upwardly therefrom adjacent the forward end thereof, a boom mounted on said frame between said side frame members for pivotal movement with respect thereto about horizontal and vertical axes, said boom being supported by said frame in a generally horizontal position during the material gathering operation, a dipper pivoted to the forward end of said boom and depending therefrom and having a digging lip extending adjacent the ground, flexible draft devices connected with said dipper for swinging said boom and dipper laterally and elevating said boom and dipper into a discharge position with respect to said frame, independently operable winding means for operating said flexible draft devices, said winding means being disposed on said frame rearwardly of said side frame members, means for guiding said draft devices from said winding means to said dipper comprising a sheave mounted in each of said side frame members adjacent the lower end thereof for rotation about a horizontal axis, a sheave bracket mounted on each of said side frame members adjacent the upper end thereof for movement about a vertical axis, a sheave journalled in each of said brackets for rotation with respect thereto about a horizontal axis, said sheave having its guiding groove in alignment with the guiding groove of said first mentioned sheave, and said brackets having stops at the forward ends thereof disposed in advance of the forward ends of said side frame members, for engagement by and stopping said dipper in a material discharge position, and said stops being maintained in alignment with said dipper during upward movement thereof by the reaction of said draft devices against said second mentioned sheaves.

10. In a power mucking machine of the class described, a wheel mounted frame having an outboard platform projecting forwardly therefrom having an arcuate advance face, a yoke vertically pivoted to said frame for lateral movement along said platform, a retainer for said yoke retaining said yoke from vertical movement with respect to said platform, said retainer extending downwardly from said yoke along said arcuate face of said platform and having a gib extending inwardly therefrom for engagement with the undersurface of said platform, a boom pivoted to said yoke intermediate the ends thereof and extending forwardly therefrom beyond the forward end of said platform, a dipper pivoted to the forward end of said boom and depending therefrom when in a digging position, flexible draft devices extending from elevated positions with respect to said frame and connected with said dipper for elevating said boom and dipper and laterally positioning said yoke and boom and dipper along said platform, said retainer having an upwardly opening channel therein disposed in advance of said platform, compressible members freely carried in said channel, said channel and compressible members moving laterally of said platform with said boom and an abutment plate supported on said compressible members and guided for vertical movement with respect to said channel and supporting said boom on said yoke for lateral movement across said platform and also cushioning the shocks upon the dropping of said boom on said yoke.

11. In power mucking machine, a wheel mounted frame, a boom supported on said frame for lateral movement therealong about a vertical axis and for upward swinging movement with respect thereto about a horizontal axis, a dipper transversely pivoted on the end of said boom and depending from said boom when in a digging position, flexible draft devices extending from an elevated position rearwardly of said dipper downwardly to said dipper when in a digging position and secured thereto for first pivoting said dipper upwardly with respect to said boom and then pivoting said boom and dipper upwardly to a discharge position with respect to said frame, and a movable yieldable abutment member pivotally mounted on said boom adjacent said dipper and having two angular spaced abutment faces spaced radially from the pivotal axis of said boom, one extending beneath said boom when said dipper is in a digging position, and the other extending above said boom for maintaining said dipper at a dumping angle when in its discharge position, operating means for said abutment member operable by relative movement between said boom and frame for pivotally moving said abutment member to maintain said one abutment face in engagement with said boom and maintain said dipper in a load retaining position during initial upward movement of said dipper and boom and then release said dipper to move to a relatively sharp discharge angle into engagement with said other abutment face to hold said dipper in a discharge position, and including a yieldable link connected with said abutment member and having operative connection with said operating means.

References Cited in the file of this patent

UNITED STATES PATENTS

| | | |
|---|---|---|
| 1,473,227 | Greenleaf | Nov. 6, 1923 |
| 1,481,211 | Keech et al. | Jan. 15, 1924 |
| 1,572,009 | Hansen | Feb. 9, 1926 |
| 1,657,187 | Whittlesey | Jan. 24, 1928 |
| 1,783,787 | Hansen | Dec. 2, 1930 |
| 2,157,736 | Dooley et al. | May 9, 1939 |
| 2,213,684 | Biedess | Sept. 3, 1940 |
| 2,279,529 | Royle | Apr. 14, 1942 |
| 2,301,241 | Biedess | Nov. 10, 1942 |
| 2,478,055 | Redington | Aug. 2, 1949 |
| 2,568,702 | Baker | Sept. 25, 1951 |
| 2,595,896 | Shoemaker | May 6, 1952 |
| 2,619,243 | Biedess | Nov. 25, 1952 |
| 2,626,067 | Berford et al. | Jan. 20, 1953 |